United States Patent

[11] 3,612,477

[72] Inventor George G. Allenbaugh, Jr.
Rittman, Ohio
[21] Appl. No. 34,058
[22] Filed May 4, 1970
[45] Patented Oct. 12, 1971
[73] Assignee Akron Brass Company
Wooster, Ohio

[54] SELF-LOCKING VALVE WITH UNITARY LOCKING ELEMENT
12 Claims, 4 Drawing Figs.

[52] U.S. Cl. .................................................. 251/77,
251/213
[51] Int. Cl. ...................................................... F16k 51/00
[50] Field of Search ........................................... 251/77, 81,
213, 309

[56] References Cited
UNITED STATES PATENTS
2,089,617 8/1937 Mueller .......................... 251/81 X
3,187,861 6/1965 Fawkes ........................... 251/81 X
3,198,477 8/1965 Allenbaugh, Jr. ............ 251/77
3,358,962 12/1967 Johnson ......................... 251/77

Primary Examiner—M. Cary Nelson
Assistant Examiner—David R. Matthews
Attorney—Isler and Ornstein ABSTRACT: A self-locking valve with means for preventing flow-induced movement of the flow control member, thereby releasably locking the valve at any desired setting. A unitary lock element, in the form of a plate, extends radially between a valve-operating shaft and a concentric arcuate wall of a fixed coaxial sleeve. A drive arm underlies the lock element and is affixed to the shaft for rotation therewith. A valve-adjusting member is mounted for rotation coaxially of the shaft and is provided with dependent leg portions which straddle the lock element and the drive arm to engage them simultaneously and maintain them in alignment or registry during the operative rotation of the valve. When the desired valve setting has been achieved, any flow-induced rotation of the shaft causes misalignment of the locking element with the drive arm and causes camming means on the shaft to displace the lock element into locking engagement with the arcuate wall surface so that the previously adjusted valve setting is not distributed.

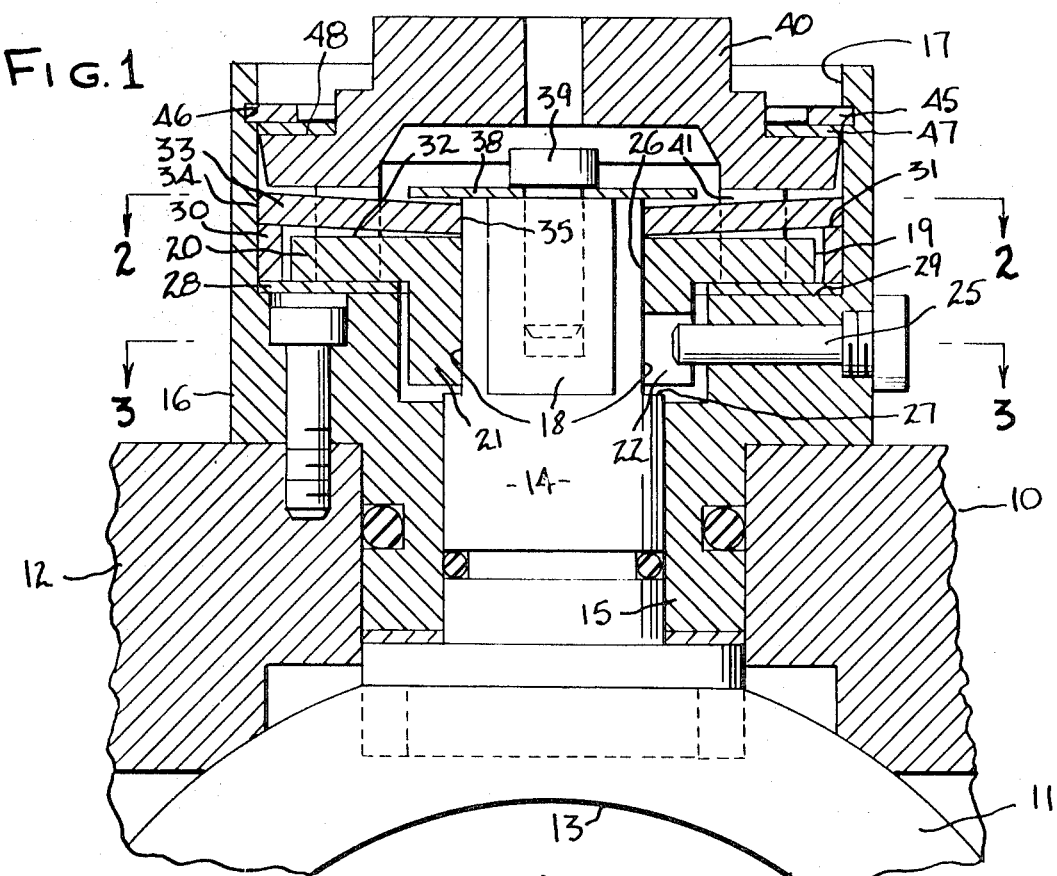

INVENTOR.
GEORGE G. ALLENBAUGH, JR.
BY
Isler & Ornstein
ATTORNEYS.

3,612,477

SELF-LOCKING VALVE WITH UNITARY LOCKING ELEMENT

BACKGROUND OF THE INVENTION

The invention is directed to flow control valves, particularly those which are utilized for liquid flow control and which use a rotatable flow control member, such as a valve plug or valve ball, customarily used in connection with firefighting lines or hoses. Such valves are required to control or meter water or other liquids flowing at high volumes and under high pressure. When the valve is adjusted to a metering position which lies between the fully opened and fully closed positions of the valve, the liquid flow impresses a rotational force upon the valve ball or plug which tends to rotate it away from the previously established setting toward one of its extreme positions, such as the fully open or the fully closed position.

In order to overcome this undesirable characteristic, valve constructions have been proposed which embody some form of locking feature which resists such flow-induced rotation of the flow control member, but does not interfere with the normal operative adjustment of the valve settings. A valve construction embodying such a locking feature is described in my U.S. Pat. No. 3,198,477 for "Self-Locking Valve" which discloses a dual spring-loaded roller clutch arrangement for maintaining the valve locked against rotation in one direction or the other. For effecting desired adjustment of the valve setting, one roller clutch or the other, depending upon the direction of rotation, is displaced in opposition to the spring to release the lock and permit adjustment of the valve to control the fluid flow. Such a locking arrangement involves a rather critical dimensional relationship between the roller clutches and the elements with which they are engaged. These elements are screw-threaded to permit the necessary fine adjustment of this dimensional relationship after all the parts of the valve are assembled and requires the use of specially designed tools for that purpose. Once this fine adjustment has been made, the screw threads are upset or peined to fix the relationship permanently and no further adjustments can be made, as required by wear or other circumstances, unless the valve is disassembled and the adjustable elements are replaced.

It will also be noted that the patented valve construction results in a normally locked condition of the valve at all times, except during the time that it is being manually adjusted to a changed flow control setting. This condition exists even though the circumstances for which the locking feature is desired and which it is intended to overcome, does not occur. Thus, because the valve is locked even when such locking action may not be required, it is possible that corrosion or dirt can needlessly cause the valve to stick or interfere with the lock-releasing operation in circumstances where the locking action was not required and performed no useful function. Additionally, the patented construction involves a multiplicity of small and often delicate parts which require precision machining and an extremely high level of quality control for satisfactory performance.

SUMMARY OF THE INVENTION

The invention eliminates the need for a dual set of parts for performing the locking function and also eliminates the need for a high degree of precision in manufacture of the parts used, by employing a unitary lock element in the form of a simple bar or plate, which requires no adjustment either before, during or after assembly of the valve. The lock plate functions to lock the valve only in response to a condition of flow-induced rotation of the valve ball, so that the valve is normally in an unlocked condition and can be freely adjusted without the complication of first releasing the locking arrangement. By utilizing a valve construction with the self-locking feature described hereinafter, the valve construction is simplified, the use of special tools for adjustment of the lock assembly is eliminated, the necessity for adjustment during assembly is likewise eliminated and the number and complexity of the parts involved is substantially reduced.

BRIEF DESCRIPTION OF THE DRAWING

FIG. 1 is a vertical cross sectional view of a valve construction embodying the features of the invention, taken in the plane indicated by the line 1—1 in FIG. 2.

FIG. 2 is a cross-sectional view, taken as indicated on line 2—2 of FIG. 1.

DESCRIPTION OF THE PREFERRED EMBODIMENT

Figure 3:
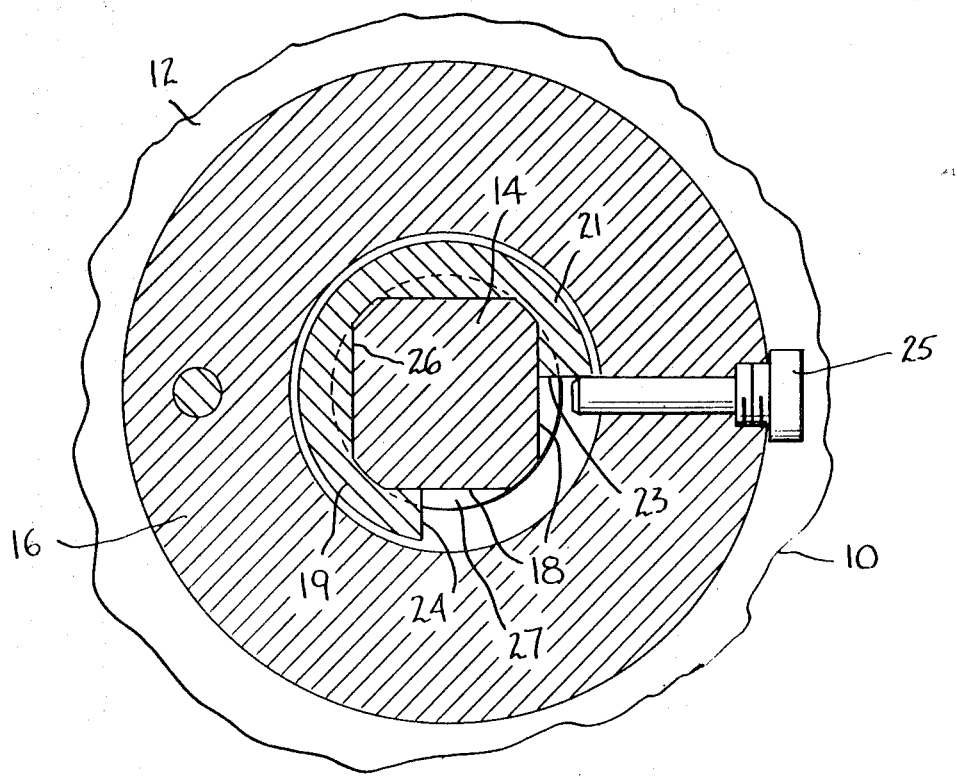
FIG. 3 is another cross-sectional view, similar to FIG. 2, but taken in the plane indicated by the line 3—3 on FIG. 1.
Figure 4:
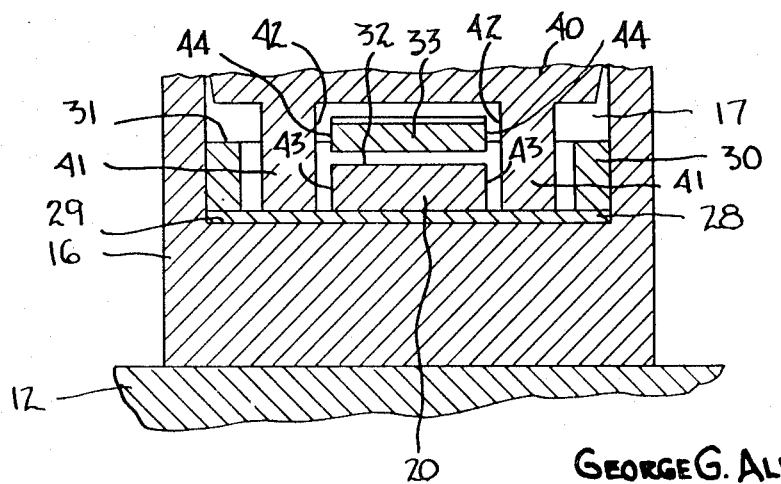
FIG. 4 is a vertical cross-sectional view, taken substantially as indicated on the line 4—4 of FIG. 2.

Referring more particularly to the drawings, there is shown a valve 10 having a flow control member in the form of a valve ball 11 which is rotatably mounted within a valve body 12. The valve ball 11 is provided with a diametrically extending flow passageway or orifice 13 which, in the flow or metering adjustment of the valve 10, is rotated from a fully closed position, where the passageway 13 is sealed off from or out of communication with the fluid flow in the pipes or lines, to a fully open position, in which the passageway 13 is in-line with the liquid flow. For a fuller description of in-line ball valves of this type, reference is made to the aforesaid U.S. Pat. No. 3,198,477.

The angular position of the valve ball 11 with respect to the liquid flow in the lines is accomplished by rotation of a trunnion or shaft 14 which is connected to the ball 11. The shaft 14 is journaled in the bearing portion 15 of a sleeve element 16 which is fixedly secured to the valve body 12. The upper portion of the sleeve 16 is of increased internal diameter and presents an arcuate wall surface 17 concentric with the axis of the shaft 14 and radially spaced therefrom.

The upper end of the cylindrical shaft 14 is machined to provide one or more camming surfaces, here shown as longitudinally extending "flats" or plane surfaces 18; there being four of such surfaces 18 indicated, which provide the upper end of the shaft with a noncircular portion of substantially square cross section. It will be understood that the quantity and arrangement of the camming surfaces shown in the drawings is merely exemplary of a preferred form of the invention and that a greater or lesser quantity of such camming surfaces may be utilized as a matter of choice, although only one of such camming surfaces is necessary in accordance with the principles of the invention.

Secured to the upper end of the shaft 14 for rotation therewith is a drive element 19 having a radially extending drive arm 20 projecting outwardly from the shaft toward the arcuate wall surface 17. The number of such drive arms and the angular spacing thereof would correspond to the number and angular spacing of the camming surfaces 18. The drive element 19 is provided with a hub or collar 21 which is recessed or cut out as at 22 to provide the opposed circumferentially spaced shoulders 23 and 24. A stop pin 25 is removably secured to the sleeve 16 and projects radially thereof into the recess 22 so as to lie in the path of rotative movement of the shoulders 23 and 24. The shoulders 23 and 24 are angularly spaced from each other sufficiently to permit the shaft 14, to which the drive element 19 is secured, to be rotated from the fully closed to the fully open positions of the valve ball 11, or vice versa, before the rotation of the shaft 14 is arrested by the abutment of the end of the stop pin 25 with the shoulder 23 or the shoulder 24, as the case may be. By utilizing a noncircular cross section for the upper end of the shaft 14 and a conforming central opening 26 in the drive element 19, the drive element can be easily and conveniently mounted on the end of the shaft for coaxial rotation therewith without the necessity for using any pins, setscrews or other additional securing means.

The drive element 19 may be longitudinally supported on the shaft 14 by the abutment of the lower edge of the collar 21 with the annular shoulder 27 formed on the shaft by the termination of the surfaces 18 or it may be supported by an antifriction Teflon washer 28 underlying the drive arms 20 and resting upon an annular shoulder 29 in the sleeve 16. A spacer ring 30 is mounted in the sleeve 16 between the ends of the drive arms 20 and the arcuate wall surface 17 so as to form an annular ledge or shoulder 31 adjacent to the arcuate wall surface 17 and slightly elevated above the upper surface 32 of the drive arm 20.

A lock element 33, in the form of a plate or bar, overlies the drive arm 20 and extends between the camming surface 18 of the shaft 14 and the wall surface 17. The outermost end of the lock element 33 is supported on the ledge or shoulder 31 of the spacer ring so that it is spaced from the surface 32 of the underlying drive arm 20. The edge 34 of the lock element at this outermost end has an arcuate configuration conforming to the radius of the wall surface 17. The inner end of the lock element 33 rests upon the drive element 19, but has no positive engagement therewith. The edge 35 of this inner end of the lock element 33 has a linear or planar portion 36 which conforms to the plane of the camming surface 18. The remainder of the inner edge 35 on either side of the linear portion 36 is radiused or cut away as at 37 to provide clearance for the locking movement of the lock element 34, as will be described hereinafter.

It is to be noted that the lock element 33 lies lightly and loosely upon the drive element 19 and has no positive or driving engagement therewith that would cause the lock element 33 to move simultaneously with the movement of the drive arm 20. The lock arm 33 lies loosely between the wall surface 17 and the camming surface 18 on the shaft 14 to define or establish a radial span therebetween. The assembled lock element 33 and drive element 19 are retained against longitudinal displacement on the shaft 14 by means of a washer 38 secured to the end of the shaft by means of a capscrew 39.

A valve-adjusting or valve-operating member 40 is mounted in the upper end of the sleeve 16 for coaxial rotation relatively to the shaft 14. The member 40 is provided with pairs of depending fingers or legs 41, each pair of which straddles an assembled lock element 33 and its adjacent drive arm 20. However, the opposed faces or abutment surfaces 42 of these leg portions 41 are circumferentially spaced to a slight extent from the straddled edges of the lock element 33 and the drive arm 20; these straddled edges being indicated by the reference numerals 43 and 44 respectively.

The valve-operating member 40 is supported in elevated position within the sleeve 16 by the leg portions 41 which rest and ride upon the previously described washer 28. The member 40 is retained against upward longitudinal displacement by means of a snapring 45 which is secured in an annular recess 46 in the sleeve 16 so as to overlie a Teflon washer 47 which is mounted on an annular shoulder 48 of the member 40.

If there is one camming surface 18 employed in the valve construction, then only one locking element 33 would be employed in combination with one drive arm 20 which is straddled by one pair of legs 41 of the valve-operating member 40. If more than one camming surface 18 is utilized, as illustrated in the drawings, then this combination of drive arm 20, lock plate 33 and straddling leg portions 41 is duplicated in association with each such camming surface.

To operate the valve, the member 40 is rotated to cause the surface 42 of one of the pair of legs 41 to come into abutment with the straddled edges 43 and 44 of the lock element 33 and the drive arm 20 on one side thereof. The width of the locking element 33 and of the drive arm 20 is such that, when the locking element 33 extends radially with respect to the axis of the shaft 14, the surface 42 abuts the edges 43 and 44 simultaneously without affecting the relative position between the parts 33 and 20. As the valve-operating member 40 is rotated, the rotation is transmitted through the leg 41 to the drive arm 20 to cause rotation of the shaft 14 to any setting within the arc defined by the shoulders 23 and 24 of the recess 22. The rotation of the shaft 14 is transmitted to the valve ball 11 to position its orifice 13 in the desired angular position to meter the flow of liquid through the valve. Inasmuch as the locking plate 33 is also free to move, it moves contemporaneously with the rotational movement of the drive arm 20 and of the shaft 14.

When the valve ball has been rotated to the desired position or setting, the manual or power-actuated movement of the member 40 is stopped. If further adjustment of the setting is desired, the member 40 is again rotated, either in the same direction or in the opposite direction of movement. If the movement is in the opposite direction, the action is the same as previously described except that the driving abutment is achieved by the surface 42 of the other of the pair of legs 41 against the opposite edges 43 and 44 of the parts 33 and 20. There is no locking action on the valve in either direction of movement, either during the movement or when the valve has been set at its desired metering position.

In the event the force of fluid flow acts upon the valve ball 11 to change its angular setting, the camming surface 18 will be rotated relatively to the lock element 33 so that the lock element no longer has the previously described radial relationship to the axis of the shaft 14. The radial span defined by the lock element 33 becomes greater than the span between the arcuate wall surface 17 and the operative portion of the camming surface 18, as defined by its abutment with the edge 35 of the lock element. In effect, only a very small degree of relative movement between the camming surface 18 and the lock element 33 is sufficient to cause displacement of the lock element into binding or locking relationship with the wall surface 17 so that further flow-induced movement of the shaft 14 and the valve ball 11 is arrested. The valve thus remains locked at substantially the setting that was established by the rotation of the member 40. The frictional locking engagement between the edge 34 of the lock element and the wall surface 17 will increase in response to an increase of the component of rotational force imposed upon the valve ball. Thus, the locking action is automatic and functions only when the need for it arises.

If, after the locking action has occurred, the member 40 is again rotated to establish a different setting for the valve, the surface 42 of one or the other of the straddling legs 41 will first abut either the lock element 33 or the drive arm 20, depending upon whether the member 40 is being rotated in the same or an opposite direction to that which caused the locking action to occur, and as the abutted part is moved, the lock element 33 is restored to its original radial position so that free adjustment of the valve can take place.

In contrast to the self-locking arrangements of the prior art, the locking element 33 is a single unitary piece which is extremely economical to manufacture on a production basis and which requires no critical adjustments or no tools for its assembly into the valve structure. Although various forms of camming surfaces can be utilized, the plane surface herein described is simple and economical to provide on the shaft 14 and functions extremely effectively within a very small range of angular movement of the shaft 14 relatively to the lock element 33. As wear occurs on the wall surface 17 or on the edges of the lock element 33, no replacement of parts or adjustment is necessary as the locking function will still occur and such wear will merely be reflected in a slightly less sensitive, but still adequate, range of operation of the self-locking construction.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a self-locking valve, the combination of a flow control member, a shaft secured to said member for rotating said member between open and closed positions, a sleeve fixedly mounted in coaxial relationship to said shaft and presenting an arcuate wall surface in spaced relationship to said shaft, a displaceable unitary lock element movably supported to lie between said shaft and said arcuate wall surface and define a radial span therebetween, means carried by said shaft and engaging said lock element to effect displacement thereof into locking engagement with said wall surface in response to angular rotation of said shaft relatively to said lock element in either direction, and a valve-operating member movable into simultaneous engagement with said shaft and said lock element to effect contemporaneous selective angular rotation thereof, whereby to prevent displacement of said lock element into said locking engagement.

2. A combination as defined in claim 1, wherein a portion of said lock element extends radially between said shaft and said wall surface during said contemporaneous rotation.

3. A combination as defined in claim 2, wherein said means decreases said radial span in response to said relative rotation of said shaft.

4. A combination as defined in claim 3, wherein said means comprises a camming surface carried by said shaft and engaging one end of said lock element.

5. A combination as defined in claim 5, wherein said shaft is cylindrical and said camming surface is provided by a noncylindrical area on said shaft.

6. A combination as defined in claim 5, wherein said noncylindrical area is a first planar surface and said one end of said lock element presents a second planar surface abutting said first planar surface.

7. A combination as defined in claim 6, wherein the other end of said lock element presents an arcuate surface conforming to said arcuate wall surface.

8. A combination as defined in claim 2, wherein said portion of said lock element extends nonradially between said shaft and said wall surface in response to displacement by said means.

9. A combination as defined in claim 1, including a drive arm provided on said shaft for rotation therewith and extending radially therefrom into the path of movement of said valve operating member.

10. A combination as defined in claim 9, wherein said lock element overlies said drive arm and is coincident therewith.

11. A combination as defined in claim 10, wherein said valve-operating member is provided with projecting leg portions straddling said drive arm and said lock element.

12. A combination as defined in claim 11, wherein said valve-operating member is rotatably mounted in said sleeve coaxially of said shaft.